Patented Nov. 4, 1924.

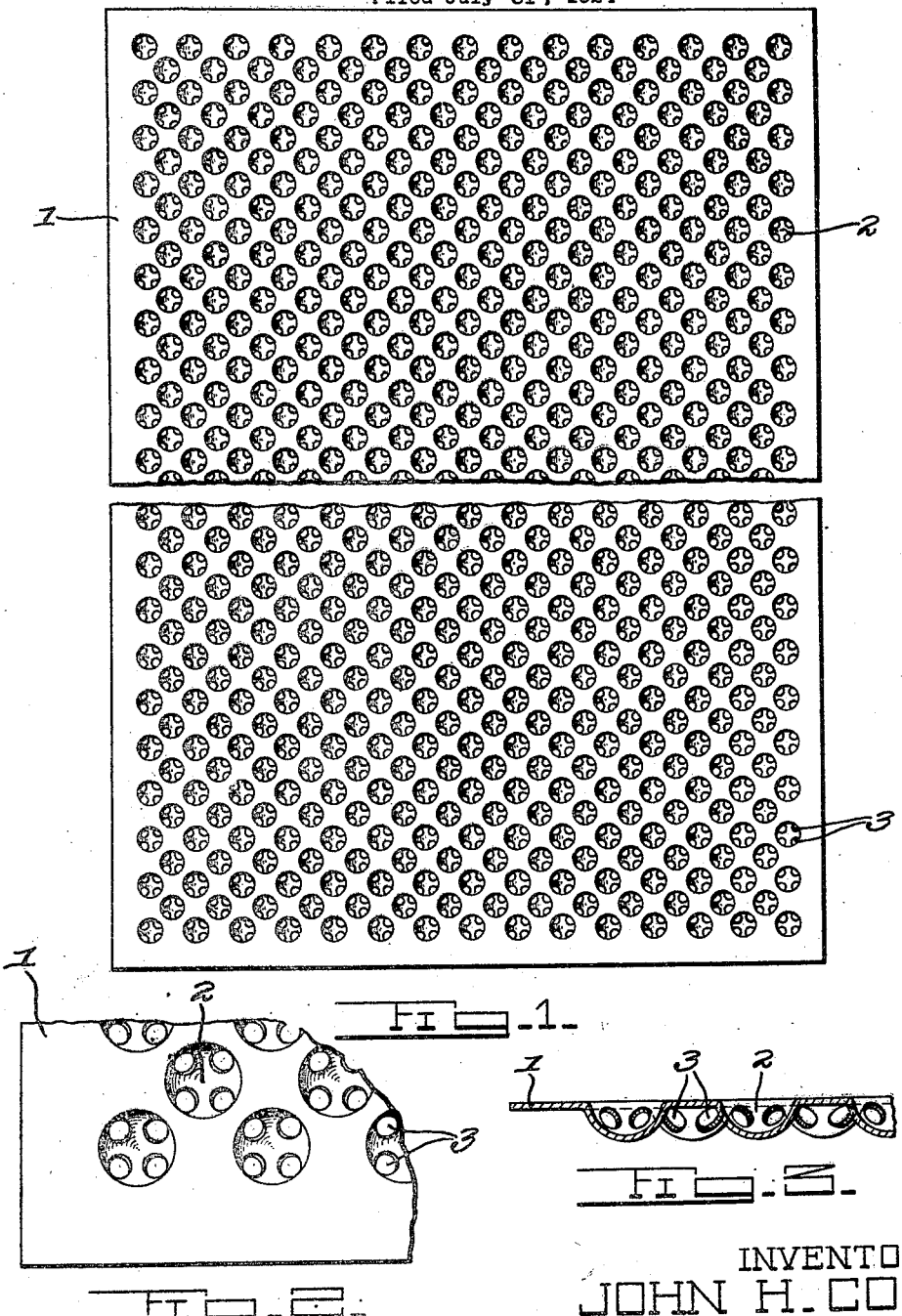

1,514,374

UNITED STATES PATENT OFFICE.

JOHN H. COX, OF WASHINGTON, DISTRICT OF COLUMBIA, DEDICATED, BY MESNE ASSIGNMENTS, TO THE CITIZENS OF THE UNITED STATES.

COMMERCIAL AND LABORATORY GRAIN SIEVE.

Application filed July 31, 1924. Serial No. 729,405.

(FILED UNDER THE ACT OF MARCH 3, 1883, 22 STAT. L., 625.)

*To all whom it may concern:*

Be it known that I, JOHN H. COX, a citizen of the United States, and an employee of the United States Department of Agriculture, residing at Washington, in the District of Columbia, have invented a new and useful Commercial and Laboratory Grain Sieve, of which the following is a specification.

This application is made under the act of March 3, 1883, Chapter 143 (22 Stat. 625) and the invention herein described and claimed may be used by the Government of the United States or any of its officers or employees in the prosecution of work for the Government, or any person in the United States, without payment to me of any royalty thereon.

The invention relates to improvement in grain cleaning machines and grain laboratory hand sieves in which the sieve has a series of indentations in regular order. Around the bottom of this indentation are a number of holes placed at regular intervals. These holes in the indentations are made of different diameters in the different sieves depending upon the diameter of the weed seed that is to be taken out of the grain. The depth and size of the indentations are different depending upon the weed seed to be taken out. The objects of the improvement are to separate the weed seeds from grain such as wild oats from barley and water grass seed from rough rice. The multiplicity of holes in the indent gives capacity to the machine and gives the weed seed several chances to be separated from the grain in the shaking motion of the sieve.

The construction of the invention is illustrated in the accompanying drawing. The sieve may be made of tin, copper, aluminum, or soft steel.

In the drawing Fig. 1 represents the top view of the sieve; Fig. 2 represents a top view enlarged of a small section in detail; and Fig. 3 represents an end view of the sieve.

Referring to the drawing, 1 represents the sieve body, which is made of metal. 2 represents the indents in the body. These indents for wild oats and water grass seed are 5/16 of an inch across with 3/32 of an inch in depth. The size and depth of these indents will vary according to the size and shape of the cereal and weed seed to be separated. 3 represents the holes in the indents. The diameter of these holes to separate wild oats from barley is 7/64 of an inch unless the wild oats are very large. For the separation of water grass seed from rice three sizes of holes have been found advisable, the diameters of which are as follows: 7/64, 7½/64, and 8/64 of an inch.

The sieve operates on commercial cleaning machines which have a shaking motion applied to the sieve. The laboratory hand sieves are round in shape with practically the same construction as the sieve used on the commercial machine. The laboratory hand sieve may be used for the purpose of assisting in the grading or may be used to check approximately the results that will be obtained from the operation of the sieve used on the commercial machine.

I am aware that prior to my invention grain cleaning machines were made with indented metal or pockets which were constructed into an endless belt, cylinder, and disk machine, all of which are special machines. Therefore I do not claim this portion of the invention.

I claim:

A sieve adapted for cleaning grain, consisting of a sieve body, a plurality of circular indents in said body, said indents being provided with a plurality of openings symmetrically arranged in the side walls of the indents.

JOHN H. COX.